United States Patent
De'Longhi et al.

(10) Patent No.: US 10,932,612 B2
(45) Date of Patent: Mar. 2, 2021

(54) MILK CONTAINER THAT CAN BE ASSOCIATED WITH A COFFEE MACHINE AND COFFEE MACHINE HAVING SUCH A MILK CONTAINER

(71) Applicant: DE'LONGHI APPLIANCES S.R.L., Treviso (IT)

(72) Inventors: Giuseppe De'Longhi, Treviso (IT); Paolo Evangelisti, Bologna (IT); Enrico Zaratin, Treviso (IT); Nicola Nicoletti, Treviglio (IT)

(73) Assignee: De'Longhi Appliances S.R.L., Treviso (IT)

( * ) Notice: Subject to any disclaimer, the term of this patent is extended or adjusted under 35 U.S.C. 154(b) by 1061 days.

(21) Appl. No.: 15/324,204

(22) PCT Filed: Jul. 6, 2015

(86) PCT No.: PCT/EP2015/065301
§ 371 (c)(1),
(2) Date: Jan. 5, 2017

(87) PCT Pub. No.: WO2016/005304
PCT Pub. Date: Jan. 14, 2016

(65) Prior Publication Data
US 2017/0164781 A1    Jun. 15, 2017

(30) Foreign Application Priority Data
Jul. 7, 2014    (IT) .......................... MI2014A001238

(51) Int. Cl.
*A47J 31/46*    (2006.01)
*A47J 31/44*    (2006.01)

(52) U.S. Cl.
CPC ....... *A47J 31/4489* (2013.01); *A47J 31/4485* (2013.01)

(58) Field of Classification Search
CPC ..... A47J 31/4489; A47J 31/4485; A47J 31/44
See application file for complete search history.

(56) References Cited

U.S. PATENT DOCUMENTS

| | | | |
|---|---|---|---|
| 9,603,481 B2 * | 3/2017 | Giua | A47J 31/4489 |
| 10,178,925 B2 * | 1/2019 | Rithener | A47J 31/4485 |
| 2012/0297989 A1 * | 11/2012 | Tonelli | A47J 31/4485 99/293 |

FOREIGN PATENT DOCUMENTS

| | | |
|---|---|---|
| CN | 201899368 U | 7/2011 |
| WO | 2005102126 A2 | 11/2005 |

(Continued)

OTHER PUBLICATIONS

International Search Report issued during prosecution of International Application No. PCT/EP2015/065301, dated Feb. 9, 2015.

(Continued)

*Primary Examiner* — Ibrahime A Abraham
*Assistant Examiner* — Ahmad Abdel-Rahman
(74) *Attorney, Agent, or Firm* — Blank Rome LLP

(57) ABSTRACT

A milk container associated with a coffee machine includes a containment body for containing milk; a mixing unit for mixing milk with air and steam; an external dispenser of the mixed milk; and a movement mechanism for moving the external dispenser configured and disposed to subject the external dispenser to a combined movement for lifting it with respect to a resting surface and distancing it from the containment body without changing its own angular orientation.

12 Claims, 9 Drawing Sheets

(56) References Cited

FOREIGN PATENT DOCUMENTS

WO        2011064702 A1    6/2011
WO        2011095378 A1    8/2011
WO    WO-2011095378 A1 *   8/2011  .......... A47J 31/4485

OTHER PUBLICATIONS

Written Opinion of the International Searching Authority issued during prosecution of International Application No. PCT/EP2015/065301, dated Jan. 14, 2016.

* cited by examiner

MILK CONTAINER THAT CAN BE ASSOCIATED WITH A COFFEE MACHINE AND COFFEE MACHINE HAVING SUCH A MILK CONTAINER

CROSS-REFERENCE TO RELATED APPLICATIONS

This is a U.S. national phase application under 35 U.S.C. § 371 of International Patent Application No. PCT/EP2015/065301, filed Jul. 6, 2015, and claims benefit of priority to Italian Patent Application No. MI2014A001238, filed Jul. 7, 2014. The entire contents of these applications are hereby incorporated by reference.

TECHNICAL FIELD

The present invention relates to a milk container that can be associated with a coffee machine and a coffee machine having such a milk container.

BACKGROUND

Automatic coffee machines are known having a steam dispenser to which a milk container can be connected equipped with a mixing unit which heats the milk through a controlled flow of steam and potentially emulsifies it through a controlled flow of air before it is directly dispensed into the cup through a milk dispenser.

The milk dispenser can be positioned so as to cooperate with a coffee dispenser present on the front wall of the dispensing machine for dispensing a cappuccino or a latte into a cup.

One of the disadvantages complained of in traditional milk containers can be found in the movement mechanism for moving the milk dispenser which, with a construction that is sometimes complex, still does not allow the adjustment of the position of the milk dispenser adaptable in a versatile way to the different heights of the cups that can be positioned below the milk dispenser.

The poor adaptation flexibility of the milk dispenser due to the limits of known movement mechanisms limits the productivity of the coffee machine which is often not able to prepare more than one cappuccino simultaneously or a cappuccino in cups of different heights.

SUMMARY

The technical task of the present invention is, therefore, to provide a milk container that can be associated with a coffee machine which obviates the above-described technical drawbacks of the prior art.

Within the scope of this technical task, an object of the invention is to provide a milk container that can be associated with a coffee machine that allows the versatile adjustment of the position of the milk dispenser to adapt it to dispensing into cups that may also be of different heights.

Another object of the invention is to provide a milk container that can be associated with a coffee machine that allows the versatile adjustment of the position of the milk dispenser to adapt it to dispensing into at least two cups simultaneously.

Another object of the invention is to provide a milk container that improves the productivity of the coffee machine with which it is associated.

The technical task, as well as these and other objects, according to the present invention are reached by providing a milk container that can be associated with a coffee machine, comprising:

a containment body for containing the milk equipped with a bottom, a side wall and a cover;

a mixing unit comprising at least one mixing chamber, a supply channel for supplying milk to the mixing chamber, a supply channel for supplying steam to the mixing chamber, a supply channel for supplying air to the mixing chamber, and an outlet channel for the milk mixed with air and steam exiting from the mixing chamber; and a external dispenser of the mixed milk, in fluid communication with said outlet channel;

characterized in that it comprises a movement mechanism for moving said external dispenser, configured and disposed to subject said external dispenser to a combined movement for lifting it with respect to a resting surface for resting the container and distancing it from said containment body without changing its own angular orientation.

In a preferred embodiment of the invention the external milk dispenser is permanently oriented according to a dispensing direction that is perpendicular to said resting surface. In particular, since the resting surface is horizontal, the orientation of the external dispenser remains vertical throughout the whole movement trajectory of the milk dispenser. In this way, the milk can be directed precisely due to the force of gravity straight into the underlying cups.

In a preferred embodiment of the invention the movement mechanism of said external dispenser has only one degree of freedom. The provision of only one degree of freedom allows the user to manually adjust the position of the milk dispenser extremely simply and easily.

In a preferred embodiment of the invention the movement mechanism for moving said external dispenser is mechanically connected to the cover of said containment body. It is not excluded that the movement mechanism in a different embodiment of the invention may be mechanically connected to the side wall of said containment body.

In a preferred embodiment of the invention the movement mechanism for moving said external dispenser comprises an articulated parallelogram. In that case, preferably the articulated parallelogram comprises a first and a second lever pivoted to the containment body at one end and to the external dispenser at the other end, one of either said first or second levers having an internal channel for fluid connection of said external dispenser to said mixed milk outlet channel. It is not excluded that the movement mechanism in a different embodiment of the invention may consist of a different system of articulated levers, or a system of gear transmissions or yet another system, which allows the external milk dispenser to be subject to a combined lifting movement with respect to a resting surface of the container and distancing movement from said containment body without changing the orientation of said dispensing direction.

In a preferred embodiment of the invention the cover externally exhibits a through opening with access through the thickness thereof to the interior of the containment body for loading milk. It is therefore possible to load the container with milk either by removing the cover or without having to remove the cover by means of the through opening in the cover itself.

In a preferred embodiment of the invention the external milk dispenser has a hollow body made up of two pieces disengageably engaged for access to the internal parts thereof. This construction of the milk dispenser simplifies the cleaning and inspection operations of the internal parts of the milk dispenser.

In a preferred embodiment of the invention the milk container has quick release means for releasing the movement mechanism from the containment body. The movement mechanism therefore remains associated with the milk dispenser and can be inspected and cleaned separately and independently from the body of the milk container.

In a preferred embodiment of the invention the milk container has a stopping means for stopping the external milk dispenser in a position. The user is therefore guided in the adjustment of the position of the milk dispenser and the possibility of human error is much lower since the stopping means intervenes in a way that is perceivable by the user whenever the external milk dispenser reaches one of its different possible use positions.

Preferably the stopping means for stopping the external milk dispenser in a position is interposed between the movement mechanism and the containment body.

The present invention also discloses a coffee machine comprising a resting surface for resting the milk container and a dispensing nozzle for dispensing the steam that can be connected with said steam inlet channel.

In a preferred embodiment of the invention the milk container in use faces a front wall of the coffee machine where an external coffee dispenser is envisaged oriented according to a dispensing direction perpendicular to said resting surface towards an underlying zone for positioning cups, and the external mixed milk dispenser has at least a first position for use that is adjacent to said external coffee dispenser, wherein the external coffee dispenser is also oriented towards said zone for positioning cups.

In a preferred embodiment of the invention the external milk dispenser and the external coffee dispenser each have two dispensing holes.

In a preferred embodiment of the invention in said first use position of said external milk dispenser, said two dispensing holes of said external milk dispenser and said external coffee dispenser are all oriented with their axes towards said zone for positioning cups.

The productivity of the coffee machine is therefore optimized, since the coffee machine in cooperation with the milk container allows two cappuccinos to be dispensed completely automatically simultaneously in tall or short cups positioned by the user in the underlying dispensing zone.

Other characteristics of the present invention are also defined in the claims herein below.

BRIEF DESCRIPTION OF THE DRAWINGS

Further characteristics and advantages of the invention will more fully emerge from the description of a preferred but not exclusive embodiment of the milk container and coffee machine according to the invention, illustrated by way of non-limiting example in the accompanying drawings, in which.

DETAILED DESCRIPTION

Figure 1:
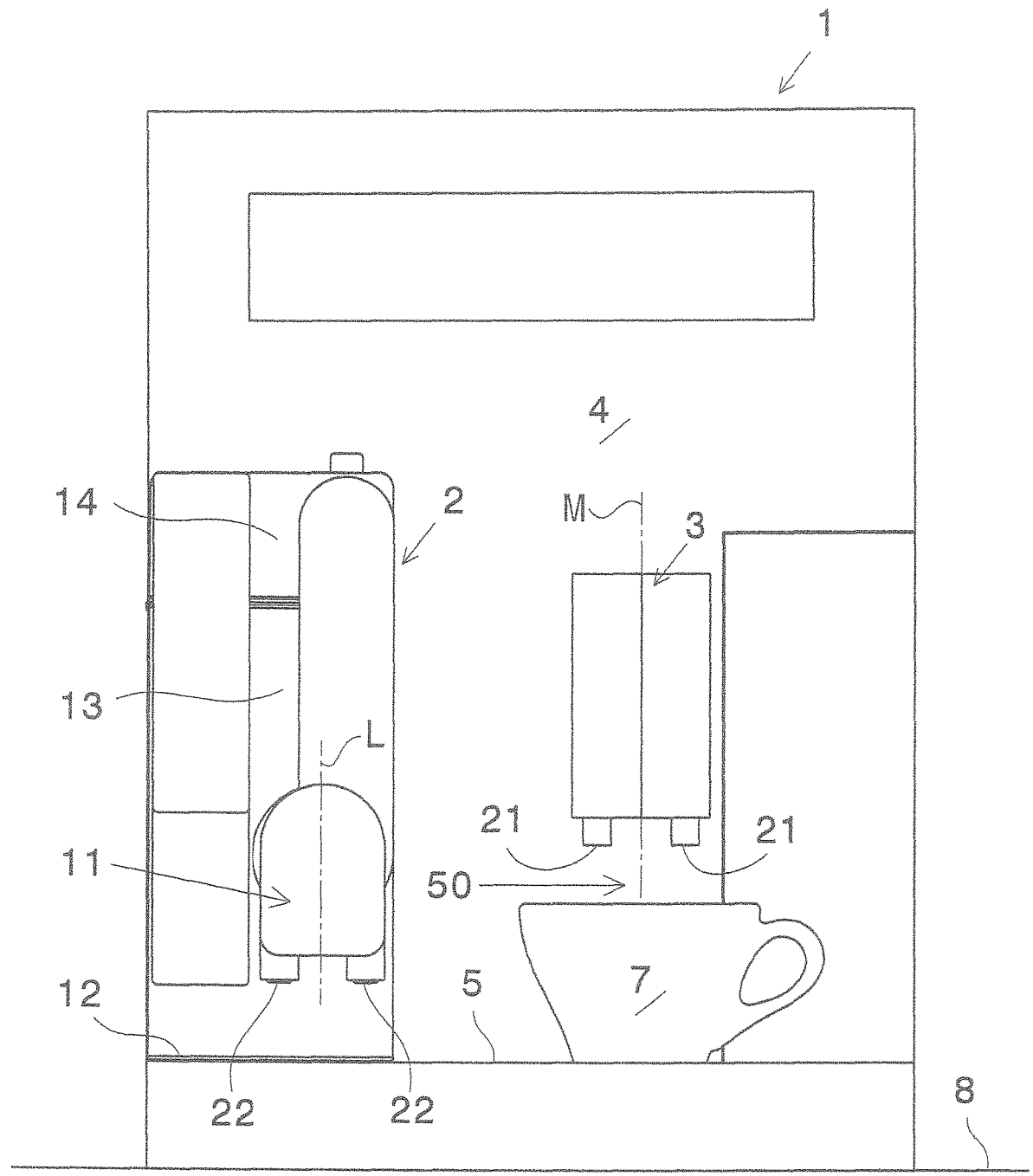
FIG. 1 shows a front view of the coffee machine with the associated milk container and the external milk dispenser in a non-use position.

With reference to the mentioned figures, a coffee machine 1 is shown and a milk container 2 that can be associated with the coffee machine 1.

The coffee machine 1 comprises in a known way a coffee dispenser 3 positioned at a front wall 4 of the coffee machine 1 at a certain height above a resting surface 5, and a dispensing nozzle for dispensing steam 6 also positioned at the front wall 4 of the coffee machine 1 to the side of the coffee dispenser 3.

The coffee dispenser 3 is supported translatably perpendicular to the resting surface 5 so as to be able to adjust its position in height above the resting surface 5 without changing its angular orientation and therefore its dispensing direction M which remains perpendicular to the resting surface 5.

The coffee dispenser 3 in particular is equipped at the bottom with two dispensing holes 21 distanced in the width direction of the coffee machine 1. The dispensing holes 21 have respective axes oriented in the dispensing direction M.

The resting surface 5 is suitable both for resting the milk container 2 and cups 7, 7'. Naturally, it is possible to provide a resting surface for resting the milk container 2 and a resting surface for resting the cups 7, 7' placed at a different height from the resting surface 8 for resting the coffee machine 1.

The milk container 2 comprises a milk containment body 9, a milk mixing unit 10 and an external mixed milk dispenser 11.

The milk containment body 9 is equipped with a bottom 12, a side wall 13 and a cover 14.

Preferably the cover 14 is assembled removably to be handled separately and independently from the rest of the containment body 9.

Furthermore the cover 14 externally exhibits a through opening 32 with access through the thickness thereof to the interior of the containment body 9 for loading milk.

The side wall 13 of the containment body 9, in the specific case of a quadrangular conformation, comprises two sides 13a that delimit the width dimension of the containment body 9 of the milk container 2, a front wall 13b and a rear wall 13c that delimit the depth dimension of the containment body 9 of the milk container 2.

The mixing unit 10 in the specific case is integrated into the cover 14 of the milk containment body 9 and comprises a mixing chamber 15, a supply channel 16 for supplying milk to the mixing chamber 15, a supply channel 17 for supplying steam to the mixing chamber and an outlet channel 18 for the mixed milk exiting from the mixing chamber 15.

The mixed milk outlet channel 18 is in fluid communication with the external milk dispenser 11.

The body of the external dispenser 11 has an internal chamber 11c and is made up of two pieces 11a, 11b disengageably engaged for access to its internal chamber 11c which can be inspected and when necessary cleaned.

The body of the external dispenser 11 also has two dispensing holes 22 at the bottom in fluid communication with the internal chamber 11c and an inlet manifold 30 for letting milk into the chamber 11.

The dispensing holes 22 are distanced in the width direction of the milk container 2 and have the same centre-to-centre distance as the coffee dispensing holes 21.

The milk supply channel 16 extends into the containment body 9 substantially right to the bottom 12 in order to draw the milk contained therein.

The mixing unit 10 also comprises a channel 51 for supplying air to the mixing chamber 15. Such air supply channel, in communication with the external environment, can be equipped with air flow adjustment means.

The mixing chamber 15 is shaped like a Venturi tube in order to allow the flow of steam coming in from the steam supply conduit 17 to create a depression in the mixing chamber 15 itself thanks to which the milk is sucked from the milk supply conduit 16 and air is sucked from the air supply conduit.

The milk container 2 comprises a movement mechanism 20 for moving the external dispenser 11.

Advantageously the movement mechanism 20 is configured and disposed to subject the external milk dispenser 11 to a combined movement for lifting it with respect to a surface 5 and distancing it from the containment body 9 without changing its own angular orientation. The milk dispensing direction L, perpendicular to the resting surface 5, is therefore unchanged.

Since the resting surface 5 is horizontal, both the coffee dispensing direction M and the milk dispensing direction L are vertical.

The mechanism 20 for moving the external dispenser 11 in the specific case is mechanically connected to the cover 14 of the containment body 9.

In a construction variation of the milk container 2 in which the mixing unit 10 is integrated into the side wall 13 of the containment body 9, the movement mechanism 20 is also mechanically connected to the side wall 13 of the containment body 9.

The movement mechanism 20 has only one degree of freedom and in the specific case comprises an articulated parallelogram.

The articulated parallelogram comprises a first lever 23 and a second lever 24, respectively, having pins 25, 26 and 27, 28, respectively, at their ends for hinging them on one side to the cover 14 and on the other side to the external milk dispenser 11.

The pins 25, 26, 27, 28 are oriented horizontally in the depth direction of the containment body 9 of the milk container 2 so that the movement of the milk dispenser 11 takes place in a vertical oriented in the width direction of the containment body 9 of the milk container 2.

In particular the hinging pins 25, 26 of the first lever 23 are axially hollow and are in fluid communication through a channel, for example comprising a tube 29, present along the body of the first lever 23.

The hinging pin 25 is rotatably and fluid-sealingly engaged with the outlet channel 18 of the mixing chamber 15, while the hinging pin 26 is rotatably and fluid-sealingly engaged with the inlet manifold 30 of the external milk dispenser 11.

The hinging pins 25, 26 and the relative connection channel can be made of a single piece with the body of the first lever 23 or, as shown, in numerous parts mutually rigidly connected.

It must be noted that the body of the first lever 23 is shaped so as to enclose the second lever 24 within it, which is not visible in any of the positions that can be assumed by the articulated parallelogram.

The milk container 2 has an appropriate quick release means for releasing the movement mechanism 20 from the containment body 9.

The release means comprises a button 33 for controlling a mobile stem 34 in contrast to and by action of an elastic element 35.

The stem 34 has a slot 36 crossed by the pin 25 of the first lever 23 and is supported translatably perpendicular to the pin 25 of the first lever 23 along a guide 37 afforded in the body of the cover 14.

The stem 34 also has an interception surface 38 of an external abutment 39 of the pin 25 of the first lever 23 and a flange 40 engageable against the external surface of the wall of the outlet channel 18 in a position defining the end stop for the stem 34.

When the button 33 is released, the elastic element 35, interposed between the flange 40 and a lower wall 41 of the cover 14, positions the stem 34 at the end stop in which the interception surface 38 is engaged against the external abutment 39 of the pin 25 preventing its extraction from the outlet channel 18. When the user presses the button 33 overcoming the force of the elastic element 35, the stem 34 translates releasing the external abutment 39 of the pin 25 from the engagement with the interception surface 38 and the pin 25 can thus be extracted from the outlet channel 18.

The milk container 2 finally has a stopping means for stopping the external milk dispenser 11 in a position.

The stopping means for stopping the external milk dispenser 11 in a position is interposed between the movement mechanism 20 and the containment body 9.

In particular the stopping means for stopping the external milk dispenser 11 in a position comprises a series of bulges 42 disposed on the front wall of the cover 14 along an arc of a circle centered on the axis of the pin 25 of the first lever 23 and a feeler comprising a ball 43 mobile in contrast to and by action of an elastic element 44.

The ball 43 is housed in a housing 45 afforded in the body of the first lever 23 and facing the front wall of the cover 14.

The housing 43 is disposed parallel to the direction of the axis of the pin 25 and at the same radial distance with respect to the bulges 42 from the pin 25 of the first lever 23.

The ball 43 is kept by the elastic element 44 in permanent contact with the front wall of the cover 14 and is translatable along the housing 45 between a retracted position when it slides along the raised connection stretch between two bulges 42 and a projecting position reached with a snap-fit engagement in a bulge 42. Obviously the position of the housing 45 and the bulges 42 can be inverted with respect to the above description.

In practice, the movement of the external milk dispenser 11 can be stopped precisely in a use position chosen between a plurality of use positions easily recognizable by the user thanks to the snap fit of the ball 43 into a bulge 42.

The provision of the coffee machine for dispensing two cappuccinos takes place as follows, according to the cups 7, 7' used.

The milk container 2 resting on the surface 5 is connected with the steam inlet channel 17 at the steam dispensing nozzle 6 of the coffee machine.

The external coffee dispenser 3 is oriented towards an underlying zone 50 for positioning cups 7, 7', and is adjustable in height above the zone 50 without changing its angular orientation.

Figure 2:
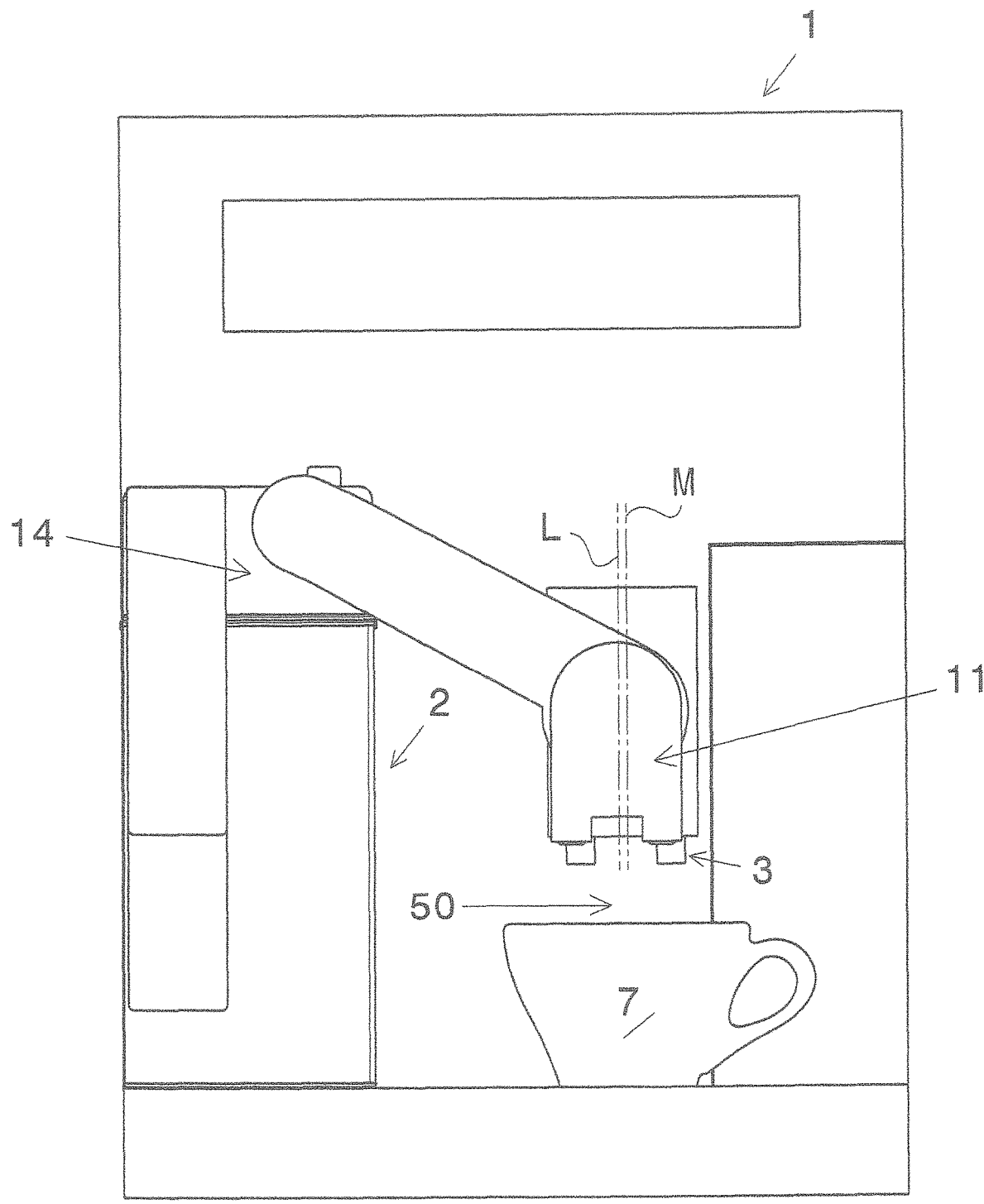
FIG. 2 shows a front view of the coffee machine with the associated milk container and the external milk dispenser in a first use position for dispensing into short cups.

With reference to FIGS. 1 and 2, the user adjusts the height position of the external coffee dispenser 3 to adapt it to the specific height of the cups 7. Then the user moves the external milk dispenser 11 from a rest position illustrated in FIG. 1, where it is disposed to the front of the basal portion of the front wall of the containment body 9, to a first use position in which it is placed to the front of the external coffee dispenser 3 and is also oriented towards the zone 50 for positioning cups 7 and with respect to the external coffee dispenser 3 it is substantially at the same distance above the resting surface of the cups 7. The user recognizes the reaching of the first use position by perceiving the snap fit of the ball 43 into one of the bulges 42. At this point the cups 7 are positioned on the resting surface 5 below the external coffee dispenser 3 and the external mixed milk dispenser 11. The cups 7 are in particular disposed alongside each other in the width direction of the coffee machine. In the movement from the rest position to the first use position the angular orientation of the external milk dispenser 11 as mentioned remains unaltered. The milk dispensing holes 22 are distanced in the width direction of the milk container 2 and have the same centre-to-centre distance as the coffee dispensing holes 21. In the first use position, two pairs of dispensing holes 21, 22 are therefore formed, each pair of holes 21, 22 being vertically aligned above a corresponding cup 7 for direct dispensing into it.

Figure 3:
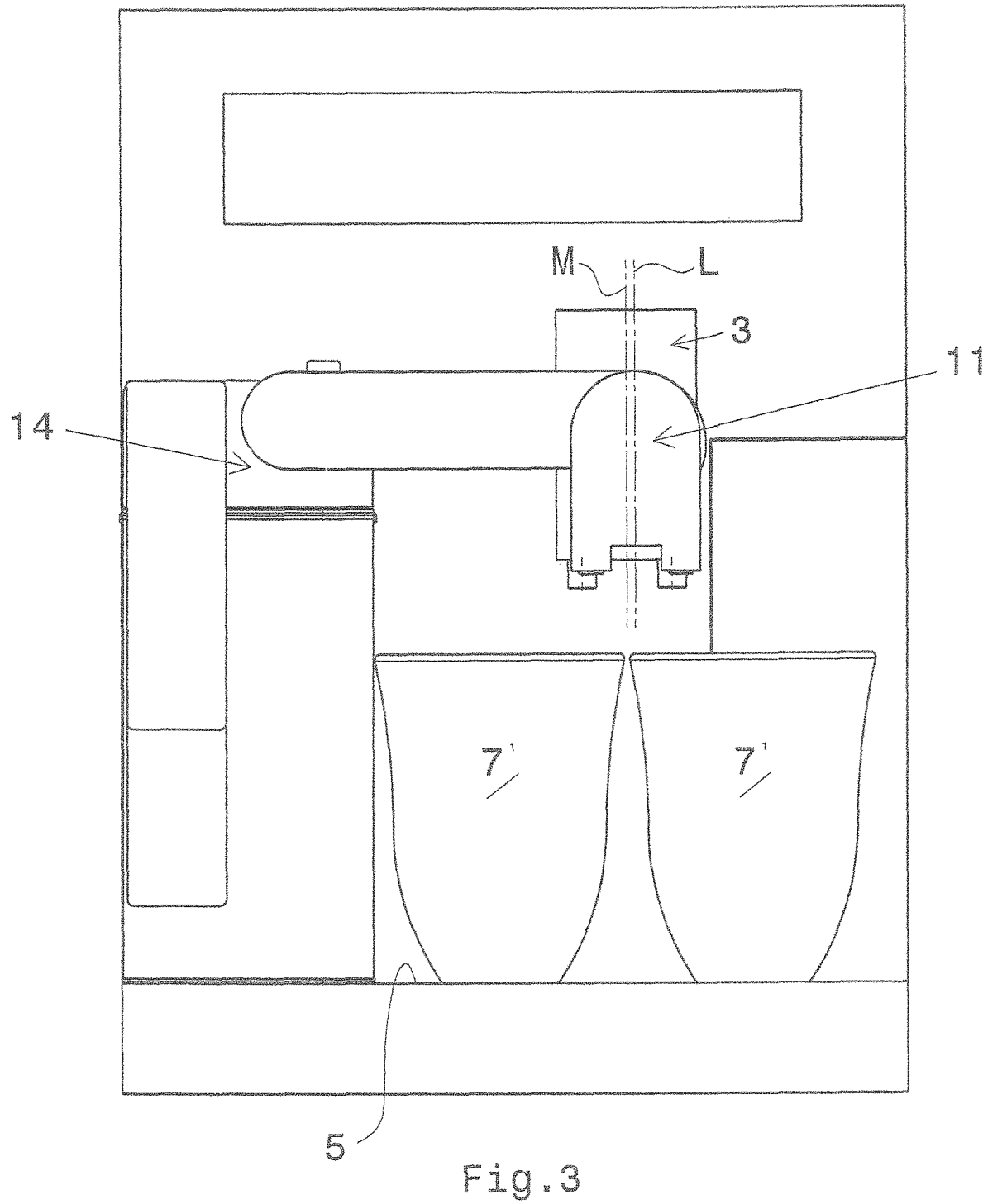
FIG. 3 shows a front view of the coffee machine with the associated milk container and the external milk dispenser in a second use position for dispensing into taller cups than those shown in FIG. 2.
Figure 4:
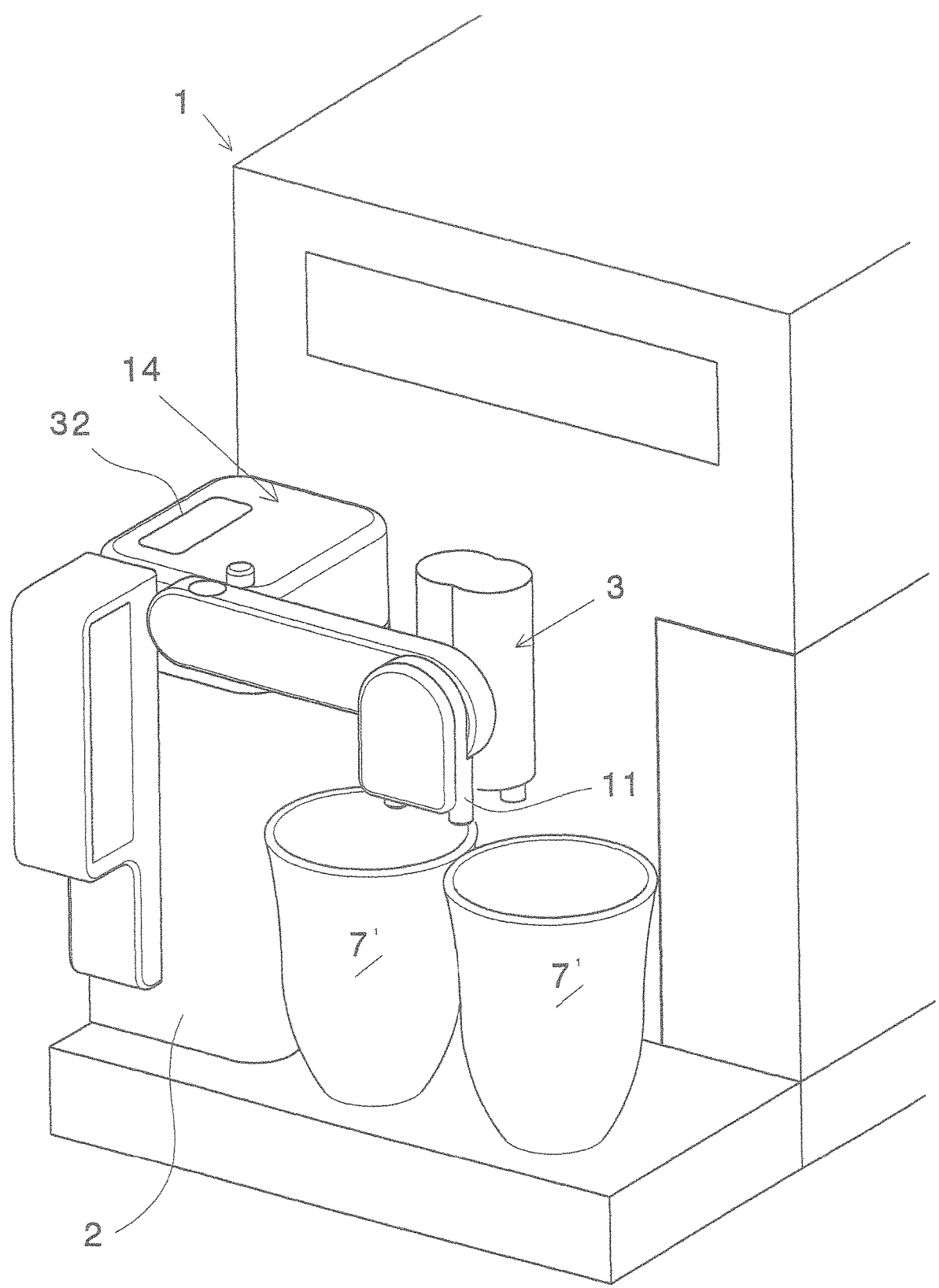
FIG. 4 shows a perspective view of the coffee machine with the associated milk container and the external milk dispenser in the second use position illustrated in FIG. 3.
Figure 5:
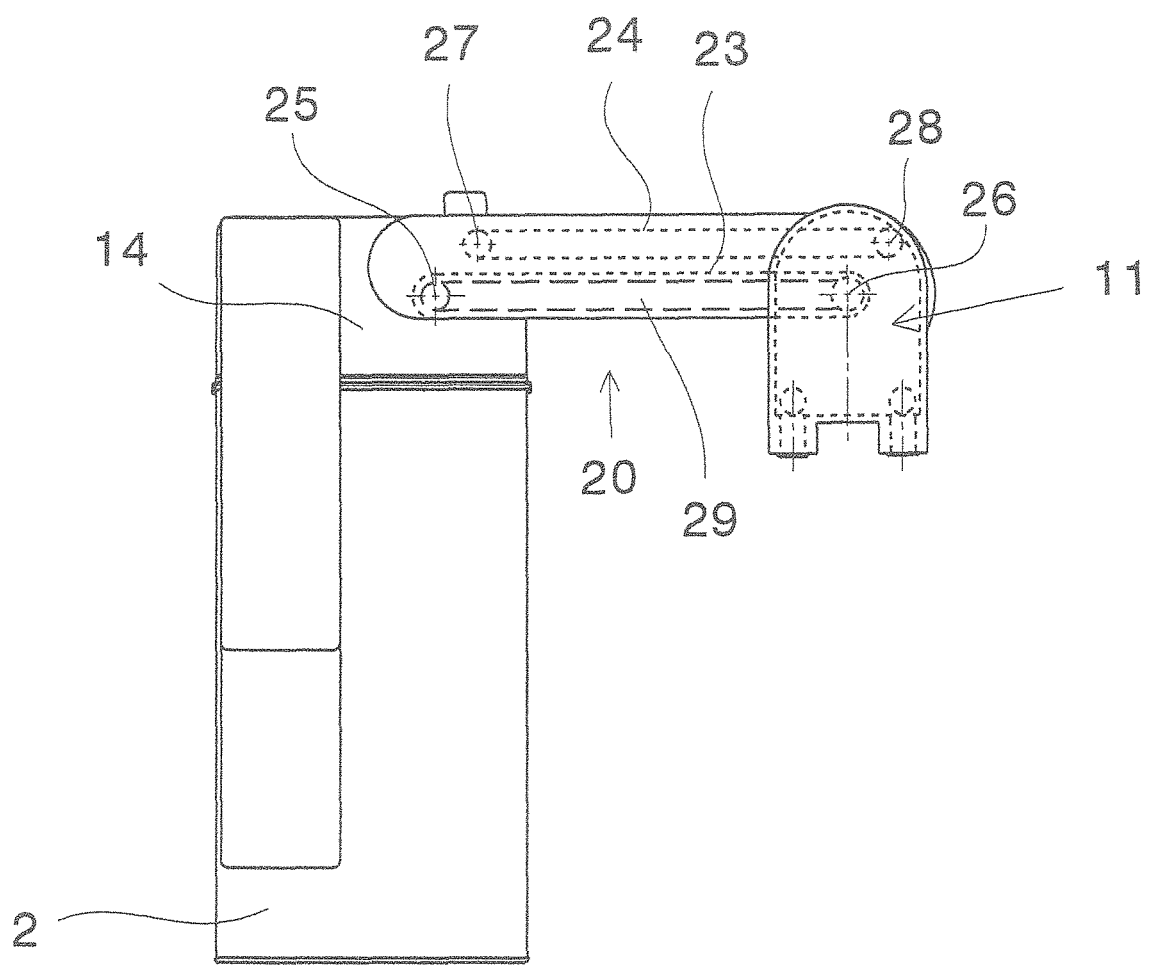
FIG. 5 shows a front view of the milk container highlighting the articulated parallelogram.
Figure 6:
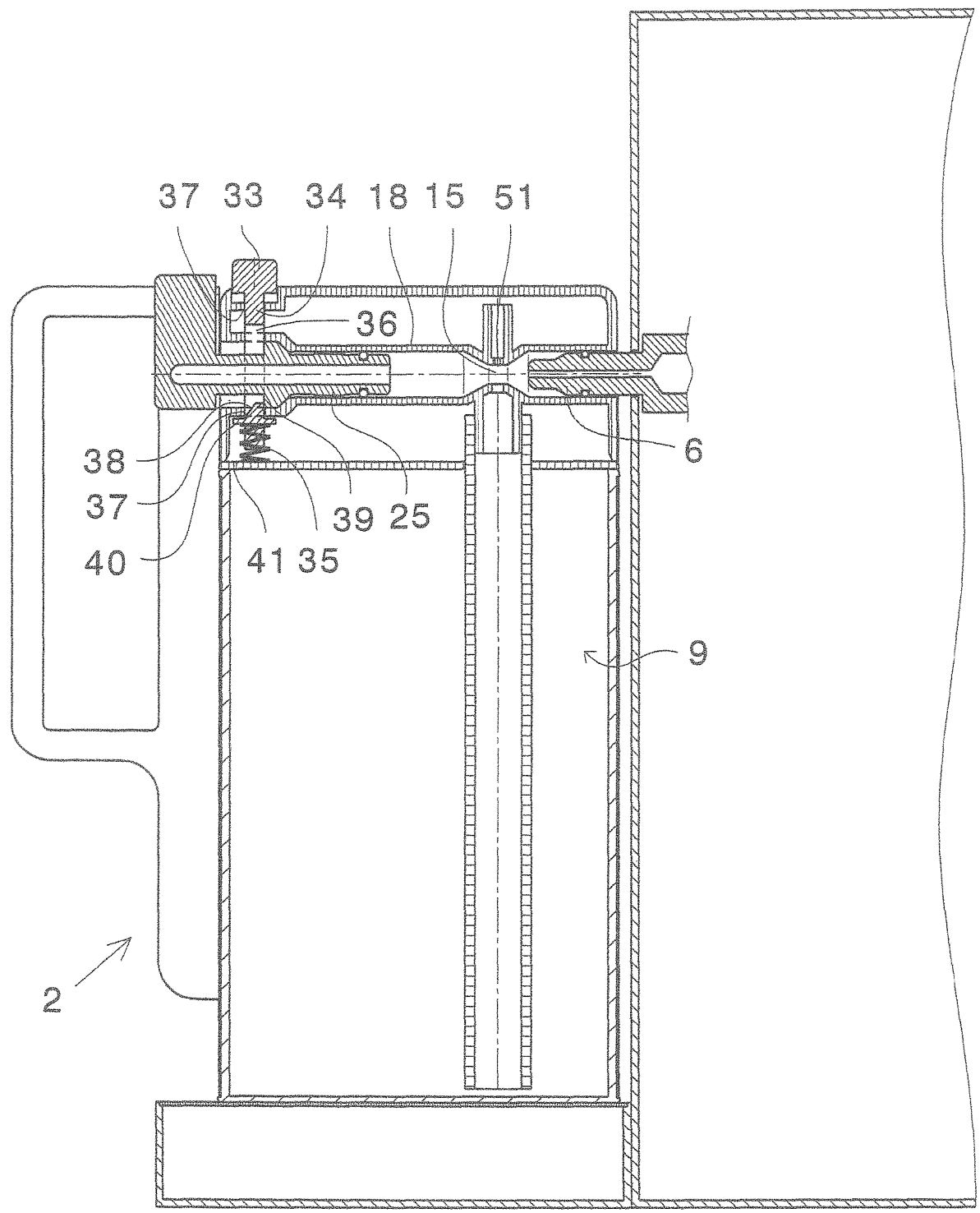
FIG. 6 shows a raised lateral view of the milk container highlighting the quick release means for releasing the movement mechanism from the milk dispenser.
Figure 7:
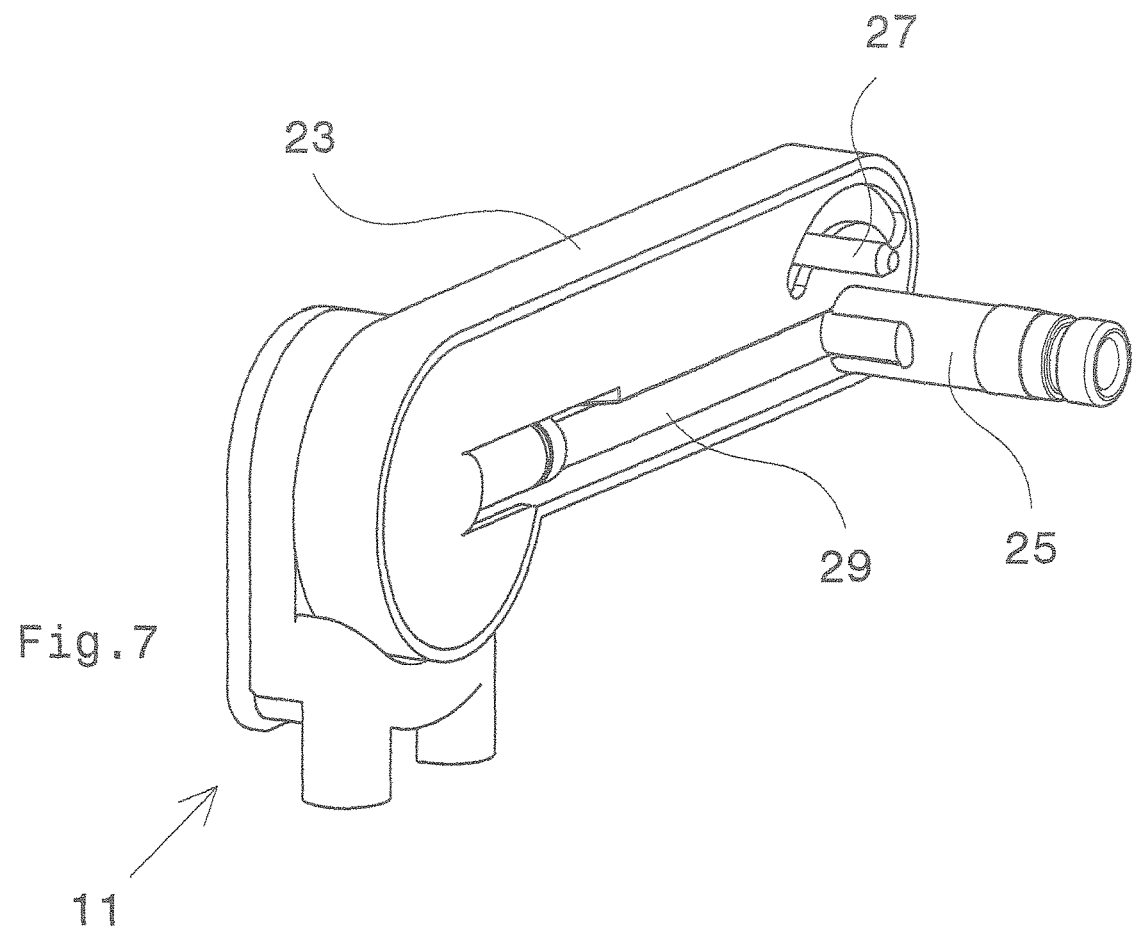
FIG. 7 shows a perspective view of the set made up of the articulated parallelogram and the external milk dispenser.
Figure 8:
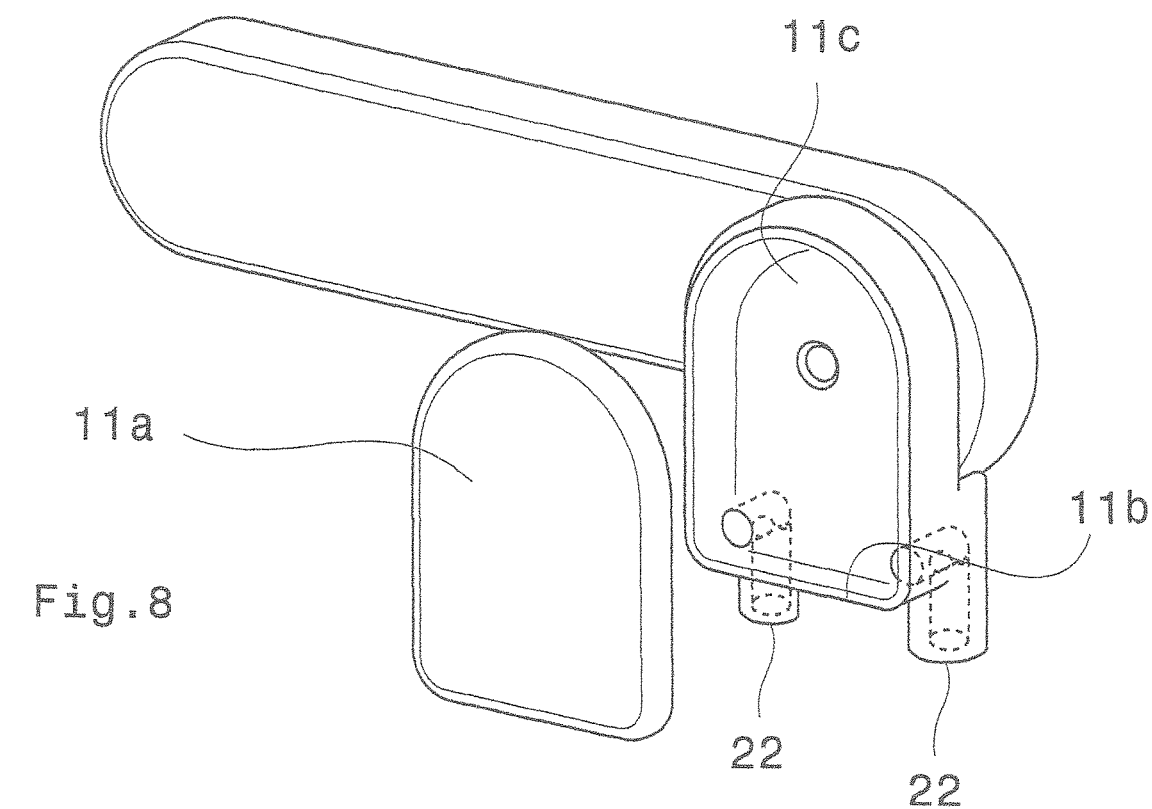
FIG. 8 shows a perspective view of the set made up of the articulated parallelogram and the external milk dispenser, in which the external milk dispenser is disassembled.
Figure 9:
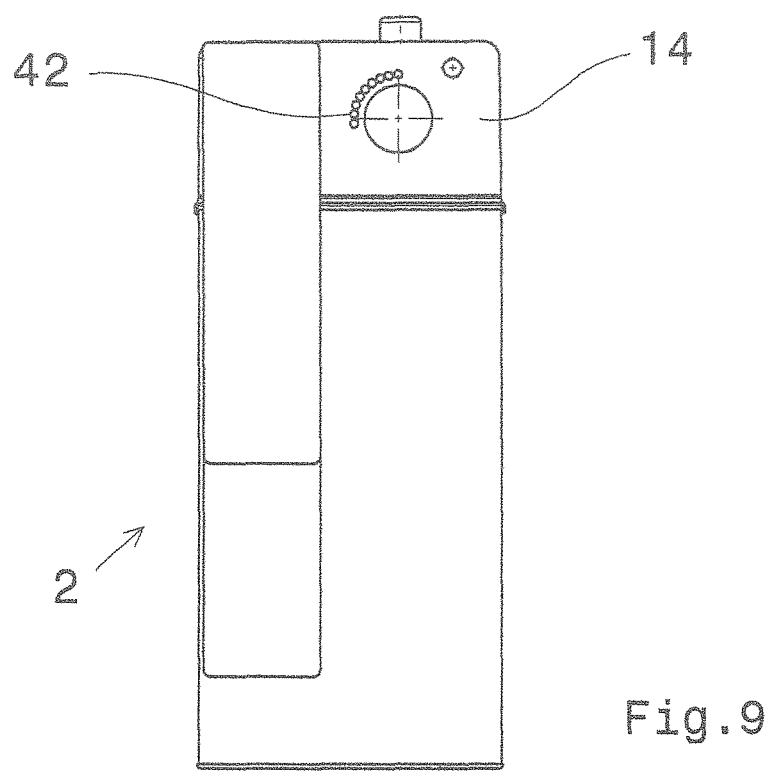
FIG. 9 shows a front view of the milk container without connection means to better illustrate the stopping means for stopping the external milk dispenser in a position.
Figure 10:
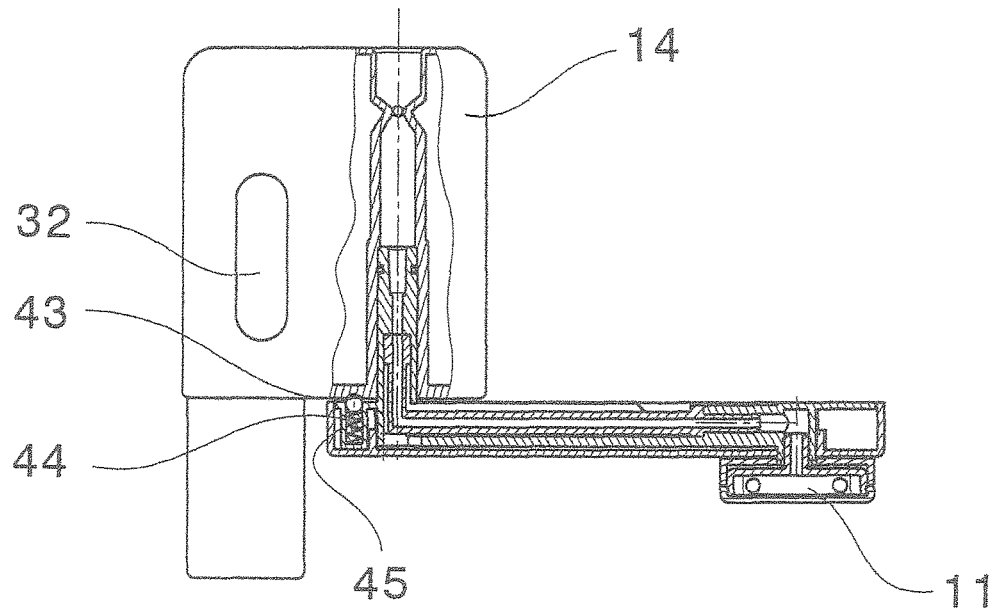
FIG. 10 shows a plan view from above of the milk container with the external milk dispenser in the second use position and partially sectioned to better illustrate the means for stopping it in position.
Figure 11:
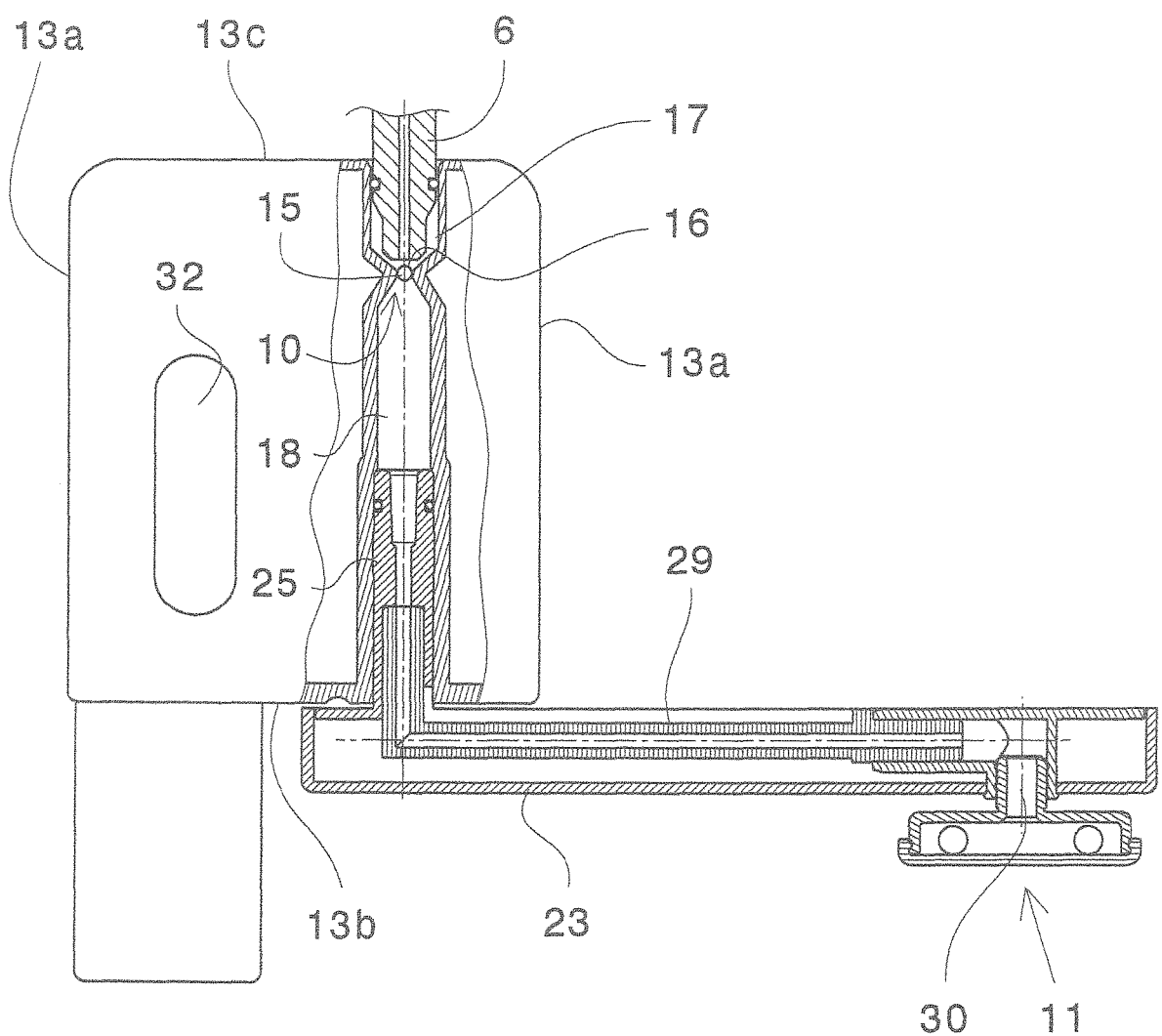
FIG. 11 shows a plan view from above of the milk container with the external milk dispenser in the second use position and partially sectioned to better illustrate the mixing unit.

With reference to FIGS. 1 and 3, the user adjusts the height position of the external coffee dispenser 3 to adapt it to the height of the cups 7'. In this case the external coffee dispenser 3 is in the raised position with respect to the one assumed in the application shown in FIG. 2, in order to consider the taller cups 7' compared to the cups 7 used in the application shown in FIG. 2. Hence the user moves the external mixed milk dispenser 11 to a second use position in which it is located in front of the external coffee dispenser 3 and is also oriented towards the positioning zone 50 of the cups 7' and with respect to the external coffee dispenser 3 it is substantially at the same distance above the resting surface of the cups 7'. At this point the cups 7' are positioned on the resting surface 5 below the external coffee dispenser 3. The cups 7' in particular are disposed alongside each other in the width direction of the coffee machine. In this second use position the external milk dispenser 11 is therefore in a raised position with respect to the one assumed in the application shown in FIG. 2. In the movement towards the second use position the angular orientation of the external milk dispenser 11 as mentioned remains unaltered. Also in the second use position, two pairs of dispensing holes 21, 22 are therefore formed, each pair of holes 21, 22 being vertically aligned above a corresponding cup 7' for direct dispensing into it.

The milk container that can be associated with an automatic coffee machine as conceived herein is susceptible to many modifications and variations, all falling within the scope of the invented concept; furthermore, all the details are replaceable by technically equivalent elements.

The materials used, as well as the dimensions, may in practice be of any type according to requirements and the state of the art.

The invention claimed is:

1. A milk container that can be associated with a coffee machine, comprising:
   a containment body configured to contain milk, the containment body provided with a bottom, a side wall and a cover;
   a mixer comprising at least one mixing chamber, a channel configured to supply milk to the mixing chamber, a channel configured to supply steam to the mixing chamber, a channel configured to supply air to the mixing chamber, and an outlet channel for the milk mixed with air and steam to exit the mixing chamber, and
   an external dispenser of the mixed milk, in fluid communication with the outlet channel; and
   a movement mechanism configured to move the external dispenser, the movement mechanism comprising four parallel, horizontally oriented hinging pins, where two hinging pins are located between the movement mechanism and the containment body and two hinging pins are located between the movement mechanism and the external dispenser, where the movement mechanism is configured and disposed to subject the external dispenser to a combined movement, both lifting the external dispenser with respect to a surface for resting the container and distancing the external dispenser from the containment body without changing an angular orientation of the external dispenser.

2. The milk container that can be associated with a coffee machine according to claim 1, wherein the external milk dispenser is permanently oriented according to a dispensing direction that is perpendicular to the resting surface.

3. The milk container that can be associated with a coffee machine, according to claim 1, wherein the movement mechanism configured to move the moving the external dispenser has only one degree of freedom.

4. The milk container that can be associated with a coffee machine according to claim 1, wherein the movement mechanism configured to move the external milk dispenser is mechanically connected to the cover of the containment body.

5. The milk container that can be associated with a coffee machine, according to claim 1, wherein the movement mechanism configured to move the external milk dispenser comprises an articulated parallelogram.

6. The milk container that can be associated with a coffee machine, according to claim 5, wherein the articulated parallelogram comprises a first and a second lever pivoted to the containment body at one end and to the external milk dispenser at the other end, one of either the first or second lever having an internal channel in fluid connection from the external milk dispenser to the mixed milk outlet channel.

7. The milk container that can be associated with a coffee machine according to claim 1, wherein the cover externally exhibits a through opening with access through the thickness thereof to the interior of the containment body for loading milk.

8. The milk container that can be associated with a coffee machine, according to claim 1, wherein the external milk dispenser has a hollow body made up of a number of pieces disengageably engaged for access to the internal parts thereof.

9. The milk container that can be associated with a coffee machine, according to claim 1, further comprising a quick release configured to release the movement mechanism from the containment body.

10. The milk container that can be associated with a coffee machine, according to claim 1, further comprising a stopper configured to stop the external milk dispenser in a position.

11. The milk container that can be associated with a coffee machine, according to claim 1, wherein the stopper configured to stop the external milk dispenser in a position is interposed between the movement mechanism and the containment body.

12. A milk container that can be associated with a coffee machine, comprising:
 a containment body configured to contain milk, the containment body provided with a bottom, a side wall and a cover;
 an external dispenser of the milk, in fluid communication with the containment body; and
 a movement mechanism configured to move the external dispenser, the movement mechanism being rotationally connected about a first axis to the containment body and being rotationally connected about a second axis to the external dispenser, the first and the second axis being parallel, where the movement mechanism is configured and disposed to subject the external dispenser to a combined movement, both lifting the external dispenser with respect to the containment body and distancing the external dispenser from the containment body, where the first and the second axis provide that the combined movement occurs without changing an angular orientation of the external dispenser.

\* \* \* \* \*